June 26, 1956 R. R. HEDDEN 2,751,767
COMBINATION FREE SWIVEL AND CONTROLLED TORQUE JOINT
Filed June 27, 1955
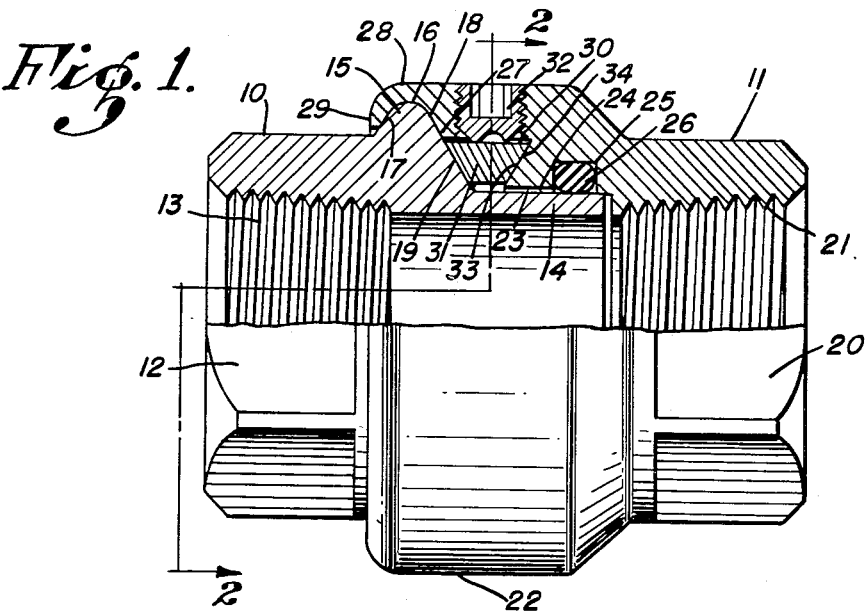
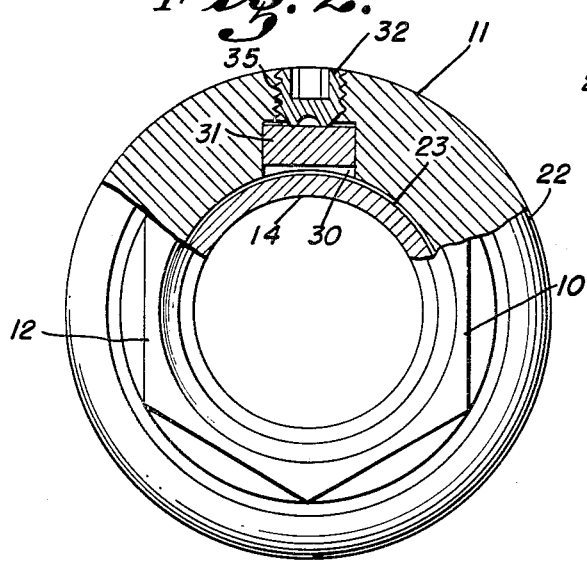
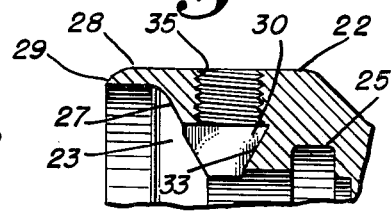
INVENTOR.
ROBERT R. HEDDEN
BY
Attorney

United States Patent Office 2,751,767
Patented June 26, 1956

2,751,767

COMBINATION FREE SWIVEL AND CONTROLLED TORQUE JOINT

Robert R. Hedden, Whittier, Calif., assignor to Emsco Manufacturing Company, Los Angeles, Calif., a corporation of California Application June 27, 1955, Serial No. 518,298

4 Claims. (Cl. 64—30)

This invention relates to swivel joints or connections, and relates in particular to a swivel connection which may be relatively cheaply made for the reason that it has only two principal swivel parts of such form that they may be readily die-cast.

It is an object of the invention to provide a simple and economical swivel connection wherein the telescoping parts are held together by a lip on one of the parts which is deformed or contracted inwardly over a shoulder of the other part, and it is a further object of the invention to provide in this swivel joint a simple brake means which may be readily adjusted so that the swivel parts will have free relative rotary movement or so that torque will be required to effect relative rotation of the swivel parts.

Further objects of the invention may be brought out in the following part of the specification wherein parts have been described in detail for competence of disclosure, without intending to limit the scope of the invention which is set forth in the appended claims.

Referring to the accompanying drawings which are for illustrative purposes only:

Fig. 1 is a partly sectioned side view of a preferred embodiment of the invention;

Fig. 2 is a sectional view taken as indicated by the line 2—2 of Fig. 1;

Fig. 3 is a fragmentary sectional view showing the holding lip prior to its deformation into holding position.

The swivel connection, as shown in Fig. 1, comprises first and second swivel parts arranged in telescoping relation and so as to have relative rotation.

The first swivel part 10 has an outer end 12 equipped with an internally threaded bore 13 so that it may be connected to a conduit such as a pipe or nipple. At its inner end the swivel part 10 has a cylinder portion 14 of external diameter smaller than the external diameter of the outer end 12 of the swivel part 10. Intermediate the ends thereof, between the outer end 12 and the cylinder portion 14, the first swivel part 10 has an annular rib or collar 15 having a continuously curved outer surface 16 merging with a conical face 17 disposed toward the outer end 12 and a conical face 18 disposed toward the second swivel part 11, or toward the cylinder portion 14. At the leftward end of the cylinder part 14 there is a conical annular shoulder 19 which faces toward the second part 11 and also merges with the conical face 18 of the collar 15 so that, in the preferred form of the invention disclosed, the conical shoulder 19 and the conical face 18 form a continuous conical surface or shoulder between the outer end 12 and the cylinder portion 14 of the first swivel part 10.

The second swivel part 11 has at its outer (rightward) end 20 an internally threaded bore 21 whereby it may be connected to the duct member such as a pipe. In its inner (leftward) end 22, the swivel part 11 has a recess 23 adapted to receive the inner end of the first swivel part 10, including the collar 15 and the cylinder portion 14. This recess 23 has a cylindrical bore 24 at its inner end to receive the cylinder portion 14 and an inwardly faced annular channel 25 to receive sealing means consisting of a sealing ring 26 arranged to engage the outer surface of the cylinder portion 14. At the leftward or outer end of the bore 24, the swivel part has a conical surface 27 confronting the conical shoulder 19 and the conical face 18 of the swivel part 10. As shown in Fig. 3, the swivel part 11 is initially made with a lip 28 which extends from the peripheral portion of the conical shoulder 27. This lip 28 is cylindrical and encloses the collar 15. When the swivel parts 10 and 11 are assembled, as shown in Fig. 1, the external portion 29 of the lip 28 is deformed inwardly so that it will be contracted into a position against the conical face 17 of the collar 15, thereby holding the swivel parts 10 and 11 together in overlapping but relatively rotatable relation.

Within the inner end 22 thereof the part 11 has a brake block cavity 30 which receives a brake block 31 adapted to be forced into frictional engagement with the shoulder 19 of the first swivel part 10 by an adjusting means shown as a screw 32. The brake block receiving cavity 30 at its front side (leftward side), as shown in Fig. 3, is in open communication with the portion of the recess 23 defined by the conical surface 27. The cavity 30 has a sloping back wall 33, and the brake block 31 has a complementary sloping face 34 to engage the back wall 33. The wall 33 slopes inwardly (toward the axis of the swivel connection) and forwardly so that as the screw 32 displaces the brake block 31 radially inwardly, it will be urged forwardly into engagement with the shoulder 19, to bear frictionally thereagainst and prevent free relative rotation of the swivel parts 10 and 11. The adjusting screw 32 is threaded into a threaded opening 35 which extends radially in the inner portion 22 of the swivel part 11 so as to communicate with the cavity 30. When the screw 32 is retracted so that there is no pressure against the brake block 31, the swivel parts have relatively free rotation. The amount of torque required for relative rotation of the parts 10 and 11 may be selectively established by adjusting the pressure of the screw 32 against the brake block 31.

I claim:

1. In a swivel connection: a first swivel part having its outer end arranged for connection to a conduit and having at its other end an inwardly projecting cylinder portion of external diameter less than that of said outer end, said first part having an annular collar projecting therefrom in a position between said outer end and said inwardly projecting cylinder portion, and an annular inwardly faced shoulder adjacent said collar; a second swivel part having its outer end arranged for connection to a conduit and having in its inner end a recess receiving said collar and said inwardly projecting cylinder portion, and a lip extending beyond said collar and being contracted radially inwardly adjacent the face of said collar disposed toward said outer end of said first swivel part to hold said first and second swivel parts together, and said second swivel part having in the inner face of the wall which forms said recess a brake block cavity with a back wall which slopes toward said shoulder, and a threaded opening communicating with said brake block cavity; sealing means arranged between said swivel parts; a brake block in said cavity arranged to slide along said back wall toward said shoulder of said first swivel part; and a screw in said threaded opening for moving said brake block along said back wall into frictional, braking engagement with the face of said shoulder, whereby the torque required to effect relative rotation of said swivel parts may be controlled.

2. In a swivel connection: a first swivel part having its outer end arranged for connection to a conduit and having at its other end an inwardly projecting cylinder portion, said first part having an annular collar projecting therefrom in a position between said outer end and said inwardly projecting cylinder portion, and an annular inwardly faced shoulder adjacent said collar; a second swivel part having its outer end arranged for connection to a conduit and having in its inner end a recess receiving said collar and said inwardly projecting cylinder portion, and a lip extending beyond said collar and being contracted radially inwardly adjacent the face of said collar disposed toward said outer end of said first swivel part to hold said first and second swivel parts together, and said second swivel part having in the inner face of the wall which forms said recess a brake block cavity with a back wall which slopes toward said shoulder, and a threaded opening communicating with said brake block cavity; sealing means arranged between said swivel parts; a brake block in said cavity arranged to slide along said back wall toward said shoulder of said first swivel part; and a screw in said threaded opening for moving said brake block along said back wall into frictional, braking engagement with the face of said shoulder, whereby the torque required to effect relative rotation of said swivel parts may be controlled.

3. In a swivel connection: a first swivel part having its outer end arranged for connection to a conduit and having at its other end an inwardly projecting cylinder portion of external diameter less than that of said outer end, said first part having an annular collar projecting therefrom in a position between said outer end and said inwardly projecting cylinder portion, and an annular inwardly faced shoulder adjacent said collar; a second swivel part having its outer end arranged for connection to a conduit and having in its inner end a recess receiving said collar and said inwardly projecting cylinder portion, and a lip extending beyond said collar and being contracted radially inwardly adjacent the face of said collar disposed toward said outer end of said first swivel part to hold said first and second swivel parts together, and said second swivel part having in the inner face of the wall which forms said recess a brake block cavity; sealing means arranged between siad swivel parts; a brake block in said cavity arranged to be moved in said cavity toward a face of said first swivel part; and a screw in said threaded opening for moving said brake block in said cavity so as to effect frictional engagement of said brake block with said face and thereby control the torque required for relative rotation of said swivel parts.

4. In a swivel connection: a first swivel part having its outer end arranged for connection to a conduit and having at its other end an inwardly projecting cylinder portion, said first part having an annular collar projecting therefrom in a position between said outer end and said inwardly projecting cylinder portion, and an annular inwardly faced shoulder adjacent said collar; a second swivel part having its outer end arranged for connection to a conduit and having in its inner end a recess receiving said collar and said inwardly projecting cylinder portion, and a lip extending beyond said collar and being contracted radially inwardly adjacent the face of said collar disposed toward said outer end of said first swivel part to hold said first and second swivel parts together, and said second swivel part having in the inner face of the wall which forms said recess a brake block cavity; sealing means arranged between said swivel parts; a brake block in said cavity arranged to be moved in said cavity toward a face of said first swivel part; and a screw in said threaded opening for moving said brake block in said cavity so as to effect frictional engagement of said brake block with said face and thereby control the torque required for relative rotation of said swivel parts.

No references cited.